Aug. 5, 1958    R. W. STURGES    2,846,198
HEAT EXCHANGERS

Filed Nov. 26, 1954    2 Sheets-Sheet 1

INVENTOR
ROBERT WILLIAM STURGES
BY *Cushman, Darby & Cushman*
ATTORNEYS

Aug. 5, 1958

R. W. STURGES 2,846,198

HEAT EXCHANGERS

Filed Nov. 26, 1954

INVENTOR
ROBERT WILLIAM STURGES

BY Cushman, Darby & Cushman
ATTORNEYS

United States Patent Office 2,846,198
Patented Aug. 5, 1958

2,846,198

HEAT EXCHANGERS

Robert William Sturges, Bilston, England, assignor to Imperial Chemical Industries Limited, a corporation of Great Britain Application November 26, 1954, Serial No. 471,468

Claims priority, application Great Britain November 27, 1953

2 Claims. (Cl. 257—245)

This invention relates to heat exchangers, particularly heat exchangers of the plate type.

Plate-type heat exchangers commonly comprise an assembly of flat plate-like elements which are situated side by side, substantially in parallel relationship. Adjacent plate elements are separated at two opposite sides by spacer elements which are bonded to the plate elements and which may be of channel section. Each spacer element acts as a wall and two spacer elements and two plate elements define a passage of rectangular cross-section. The complete assembly of plate elements and spacer elements provides a multiplicity of passages for the fluids passing through the heat exchanger. The open ends of these passages are connected to header tanks or headers so that a fluid may readily be introduced into a set of passages. Heat exchangers having plate elements and spacer elements assembled in this way to provide main passages for fluids and having main headers are hereinafter referred to as "heat exchangers of the kind specified."

Usually, corrugated secondary surfaces are provided between adjacent plate elements for the purpose of increasing the rate of exchange of heat between two fluids.

Under some conditions of operation, particularly where the heat exchanger is employed in conjunction with a gas-turbine engine, leakage which might allow a possible mixing of the two fluids, may be dangerous.

It is an object of this invention to provide means whereby leakage in a heat exchanger of the kind specified may be reduced or prevented.

It is not readily possible to provide means whereby leakage through a plate may be detected, and the invention is therefore directed to providing means by which leakage of fluid at the sides bounded by spacer elements may readily be detected, and mixing avoided.

According to the invention, a heat exchanger of the kind specified is provided with subsidiary passages each of which is bounded by a spacer element and at least one of the plate elements, the subsidiary passages not being in communication with the main headers.

In one embodiment of the invention, adjacent plate elements of a heat exchanger are separated on each side by a spacer element which is H-shaped in cross-section, the cross-bar of the spacer element being substantially parallel with the adjacent plates and each of the limbs of the spacer element acting to space the plate elements apart. The wall thus formed by the spacer element and the edge portions of the plate elements has two subsidiary passages. Any leakage of fluid from the main passage will enter a subsidiary passage, and can be drained away without danger of mixing with the other fluid in a main header tank.

If desired the subsidiary passages may be connected at each end to secondary headers, separate from the main headers. The secondary headers may be connected to an instrument gauge to indicate any pressure increase within the subsidiary passages due to leakage.

A heat exchanger in accordance with one embodiment of the invention will now be described by way of example with reference to the accompanying drawings, of which:

Figure 2:
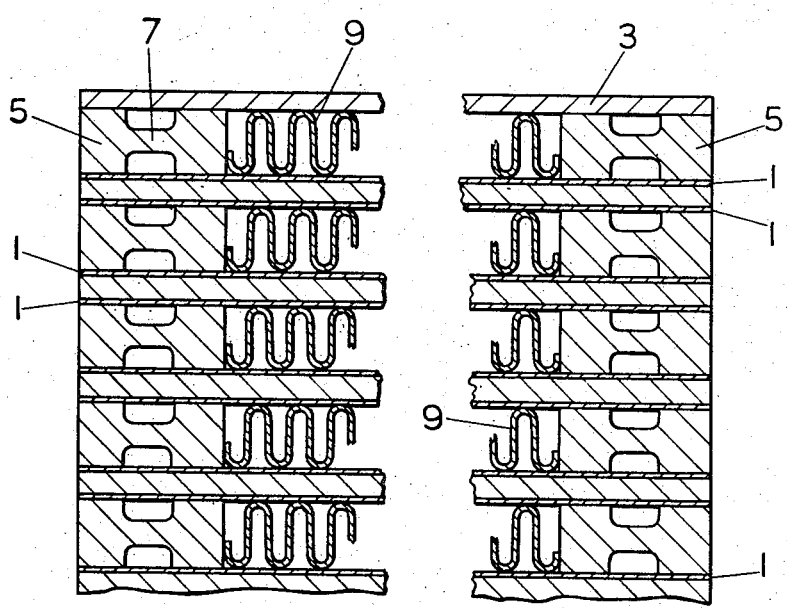
Figure 2 is a section taken along the line II—II of Figure 1, the headers being removed.

Referring to the drawings, the heat exchanger comprises an assembly of parallel plate elements 1, the end plate elements 3 being of thicker material than the remainder. Alternate pairs of plate elements are separated at each side by spacer elements 5 substantially H-shaped in cross-section (see Figure 2). The cross-bar 7 of each spacer element 5 is substantially parallel with the plate elements. The spacer elements are bonded to the plate elements and there are thus defined a series of main passages having separate subsidiary passages within the walls. Thin corrugated members 9 are disposed in each main passage, and are preferably bonded at their upper and lower parts to the plate elements.

Figure 3:
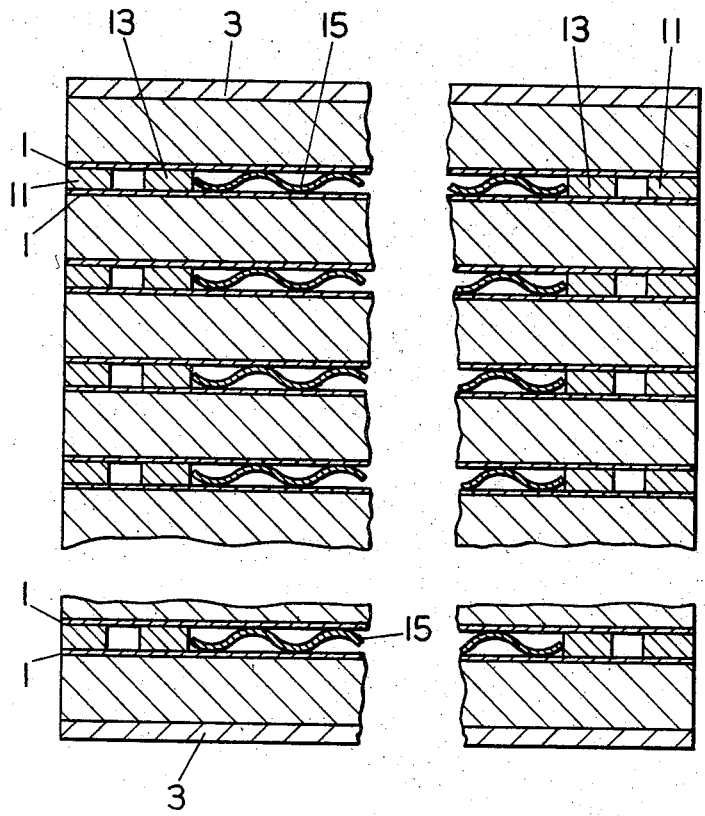
Figure 3 is a section taken along the line III—III of Figure 1, the headers being removed.

Intermediate pairs of plate elements (see Figure 3) are separated at each side by two bars 11, 13 which are bonded to the plate elements so as to form spacer elements, the bars being spaced apart so as to form with the end portions of the plate elements walls enclosing subsidiary passages. The bars 11, 13 run substantially at right angles to the H-shaped spacer elements 5 and there are thus defined a series of alternate passages through which fluid can pass in a direction at right angles to the direction of motion through the passages bounded by the spacer elements 5. Thin corrugated members 15 are disposed in each passage, and are bonded at their upper and lower parts to the plate elements.

Figure 1:
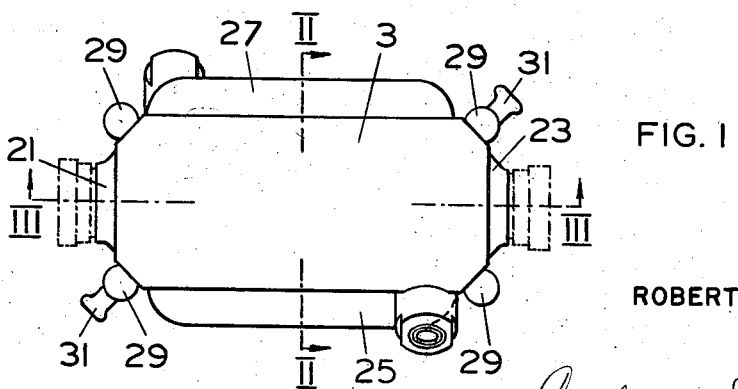
Figure 1 is a plan view of the heat exchanger.
Figure 4:
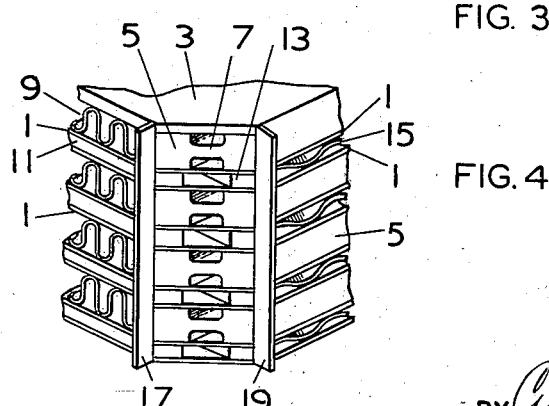
Figure 4 is a perspective view showing a corner of the heat exchanger with the headers removed.

Each corner of the unit is cut away at an angle, see particularly Figures 1 and 4, and shallow walls 17, 19 are provided at each corner to keep the outlets of the subsidiary passages separate from the outlets of the main passages.

Headers (see Figure 1) are associated with each set of main passages, the headers 21, 23 being associated with those main passages bounded by H-shaped spacer elements and the headers 25, 27 being associated with those main passages bounded by bars 11, 13. Secondary headers 29 are disposed at each corner of the unit and are connected to the subsidiary passages. The secondary header tanks are connected by plugs 31 to an instrument gauge (not shown), which will indicate pressure changes in the secondary header tanks.

When the heat exchanger is used to effect preheating of liquid fuel by hot exhaust gases, the liquid will pass through the main passages defined between the H-shaped spacer elements and the exhaust gases will pass through the other main passages. The most likely place for leakage to occur is where the spacer elements are bonded to the plate elements, and if leakage does occur in this way, the liquid will enter the subsidiary passages and the risk that the fluids will come into contact with one another, except in the secondary headers, is thus much reduced.

I claim:

1. A heat exchanger comprising a plurality of juxtaposed, generally rectangular plates, adjoining plates being separated by a pair of spacer elements disposed between opposite edge portions thereof, said spacer elements being coextensive in length with said edge portions, each spacer element pair defining with its adjoining plates a principal fluid passage, consecutive spacer element pairs being disposed at right angles to each other whereby adjoining principal fluid passages are normally disposed, each spacer element defining with each adjoining plate a subsidiary passage adapted to collect and direct escaping fluid, and headers disposed adjacent at least the opposite corners of the heat exchanger, each of said headers communicating with the associated end of the subsidiary passages defined by each of the spacer elements extending to the associated corner.

2. A heat exchanger comprising a plurality of juxtaposed, generally rectangular plates, adjoining plates being separated by a pair of spacer elements disposed between opposite edge portions thereof, said spacer elements being coextensive in length with said edge portions, each spacer element pair defining with its adjoining plates a principal fluid passage, consecutive spacer element pairs being disposed at right angles to each other whereby adjoining principal fluid passages are normally disposed, each spacer element defining with each adjoining plate a coextensive subsidiary passage adapted to collect and direct escaping fluid, each corner of said plates and the associated ends of the spacer elements adjacent thereto being diagonally cut off, and a header disposed at each diagonally cut off corner in communication with the associated ends of the subsidiary passages defined by the adjacent spacer elements associated therewith.

References Cited in the file of this patent

UNITED STATES PATENTS

| | | |
|---|---|---|
| 1,831,533 | Hubbard | Nov. 10, 1931 |
| 2,595,308 | Simpelaar | May 6, 1952 |

FOREIGN PATENTS

| | | |
|---|---|---|
| 821,798 | Germany | Nov. 19, 1951 |